United States Patent [19]
Haupenthal

[11] Patent Number: 5,542,659
[45] Date of Patent: Aug. 6, 1996

[54] MULTI-WAY SLIDE-TYPE SHUTOFF VALVE FOR SUCTION AIR OF SUCTION-TYPE GRIPPERS ON A SHEET-TRANSFER DRUM

[75] Inventor: Rudi Haupenthal, Epfenbach, Germany

[73] Assignee: Heidelberger Druckmaschinen AG, Heidelberg, Germany

[21] Appl. No.: 240,929

[22] Filed: May 10, 1994

[30] Foreign Application Priority Data

May 10, 1993 [DE] Germany .................. 43 15 527.8
May 10, 1993 [DE] Germany .................. 43 15 541.3
May 10, 1993 [DE] Germany .................. 43 15 548.0

[51] Int. Cl.⁶ ........................................... B65H 3/08
[52] U.S. Cl. ........................................ 271/108; 271/276
[58] Field of Search .................... 271/276, 196, 271/3.22, 3.23, 3.11, 5, 11, 94, 96, 108

[56] References Cited

U.S. PATENT DOCUMENTS 4,024,814  5/1977  Becker ................. 271/276 X
4,121,819  10/1978  DiFrancesco et al. ........... 271/108 X Primary Examiner—William E. Terrell
Assistant Examiner—Tamara Kelly
Attorney, Agent, or Firm—Herbert L. Lerner; Laurence A. Greenberg

[57] ABSTRACT

Multi-way slide-type shutoff valve for suction air of suction-type grippers on a sheet-transfer drum, including a plurality of closing parts, linearly slidable in a housing for optionally closing air-inlet openings connected to intake ducts of the suction-type grippers, and for closing air-outlet openings connected to a suction-air source through the intermediary of a rotary valve, the closing parts having a cylindrical shape, at least some thereof being arranged adjacent one another and in coaxial alignment, and an operating device for displacing the closing parts, is provided with springs having spring constants coordinated with one another and being disposed at least between the adjacent coaxial closing parts, at least an outer one of the closing parts being connected to the operating device.

8 Claims, 8 Drawing Sheets

MULTI-WAY SLIDE-TYPE SHUTOFF VALVE FOR SUCTION AIR OF SUCTION-TYPE GRIPPERS ON A SHEET-TRANSFER DRUM

BACKGROUND OF THE INVENTION

Field of the Invention

The invention relates to a multi-way slide-type shutoff valve for suction air of suction-type grippers on a sheet-transfer drum and, more particularly, to such a valve which is usable in sheet-fed rotary printing presses wherein sheet-transfer drums are provided for the transport of sheets, a respective sheet being held in grippers on the sheet-transfer drums, and at least some of the grippers being in the form of suction-type grippers.

Whenever there is a job change in order to print sheets of a different size or format, it is advantageous to adapt the position of the suction-type grippers on the outer cylindrical surface of the sheet-transfer drum to suit the new size or format to be printed. For this purpose, devices for adjusting the position of the suction-type grippers are used, such devices enabling individual or group-wise adjustment of the suction-type grippers in the rotational direction and perpendicularly to the rotational direction of the sheet. Simultaneously with the adjustment of the position of the suction-type grippers, it is possible for the sheet-holding surface on the outer cylindrical surface to be adapted to suit the new sheet size to be printed.

The suction-type grippers which, for reasons inherent to the design or construction, cannot be adjusted to the new sheet size or format must be rendered inoperative in order to maintain the vacuum generated by a suction-air source.

In simple devices, the suction air of each suction-type gripper situated outside of the sheet to be transported can be switched off manually by means of a valve. Such manual operations are time-consuming and are difficult to perform because of the restricted access to the shut-off valves, particularly when there are a plurality of groups of suction-type grippers, disposed in rows, on sheet-transfer drums of double- or multiple-size diameter, as compared with the diameter of the impression or blanket cylinder, for example.

In a sheet-fed rotary printing press with a plurality of sheet-transfer drums, the time required to change the suction-type grippers over is multiplied. In addition, there is the danger of incorrect adjustments when the change-over is performed manually.

The Japanese Patent 4-161336 describes a suction-air device for a transfer drum containing two slide-type shutoff valves for pair-wise shutting-off the suction air of suction-type grippers on a drum. The slide-type shutoff valves are each formed of a displaceable closing tube, which has air passages for inlet and outlet air. The air passages are rectangular in form and correspond with openings of a tube serving as a housing, the openings being connected to the intake ducts of suction-type grippers. A disadvantage of this device is that the closing tube is expensive to manufacture due to the rectangular penetrations and the relatively large sealing surface.

A similar device is also described in the Japanese Patent 4-158041. Two closing elements are provided in a suction tube, the closing elements being simultaneously displaceable inside the suction tube with the aid of a threaded spindle. The suction-air connection is situated approximately in the center of a transfer drum, so that the suction-air holes of suction-type grippers, the suction-air holes being situated further to the outside in relation to the respective closing element, have no connection to a suction-air source. A disadvantage of this device is that, when suction-type grippers are being rendered inoperative, the closing elements have to cover long adjustment distances, which requires a long adjustment time, and the fact that such adjustment mechanisms are required separately for each row of suction-type grippers, which signifies increased expense.

SUMMARY OF THE INVENTION

It is accordingly an object of the invention to provide a multi-way slide-type shutoff valve for suction air of suction-type grippers, the multi-way slide-type shutoff valve being of simple construction and being relatively inexpensive to manufacture.

With the foregoing and other objects in view, there is provided, in accordance with the invention, a multi-way slide-type shutoff valve for suction air of suction-type grippers on a sheet-transfer drum, including a plurality of closing parts, linearly slidable in a housing for optionally closing air-inlet openings connected to intake ducts of the suction-type grippers, and for closing air-outlet openings connected to a suction-air source through the intermediary of a rotary valve, the closing parts having a cylindrical shape, at least some thereof being arranged adjacent one another and in coaxial alignment, and an operating device for displacing the closing parts, comprising springs having spring constants coordinated with one another and being disposed at least between the adjacent coaxial closing parts, at least an outer one of the closing parts being connected to the operating device.

The multi-way slide-type shutoff valve is formed of rotary parts which are simple to manufacture and, with the aid of the operating device, permits the optional closing of the connection between a suction-air channel of a suction-type gripper and a suction-air source. The operating device may be operated manually or may be connected to a driving device, the driving device being controlled by a central printing-press control.

An advantageous construction results if three closing parts are provided for each sheet edge and row of suction-type grippers, with a further spring being disposed between the closing part facing away from the operating device and a stop and with the ratio of the spring stiffnesses, acting in series, being 1:2:4. When the closing part connected to the operating device is displaced in the direction of the stop, the closing parts successively come up against the stop and into contact with one another.

Each closing part may be associated with the intake ducts of two suction-type grippers disposed symmetrically with respect to the central plane of the sheet-transfer drum, if it is assumed that a sheet is transported symmetrically with respect to the aforementioned central plane on the sheet-transfer drum.

A low-cost design for a plurality of rows of suction-type grippers disposed on a sheet-transfer drum can be achieved in that n closing parts are provided for shutting off every n suction-type grippers disposed in pairs with respect to the central plane of the sheet-transfer drum and in that further groups each with n closing parts are provided for every further row of suction-type grippers. The closing parts should, in this case, advantageously be disposed in a common housing on an operating rod.

The object of the invention is achieved in that, in a multi-way slide-type shutoff valve consisting of a plurality of cylindrical closing parts linearly sliding in a housing, the closing parts are disposed on a threaded spindle serving as an operating device, with the closing parts being secured against rotation in the housing and with the threaded spindle being adapted to be driven rotationally, and with the closing parts being associated with at least two rows of suction-type grippers.

The threaded mating of the closing parts with the threaded spindle may advantageously be air-tight, with the result that the overflow of air across the thread is prevented.

The threaded spindle may comprise sections of different thread pitch, it being possible for each section to be associated with a closing part. In this embodiment, the closing parts cover different distances when the threaded spindle is rotated, with the result that the air-inlet and air-outlet openings are successively closed or opened, depending on the positions of the closing parts. Likewise, it is possible for the threaded spindle to comprise a continuous thread of one and the same pitch, with, in this case, the positions of the air-inlet and air-outlet openings being matched to one another.

An object of the invention is achieved in that, in a multi-way slide-type shutoff valve formed of a plurality of cylindrical closing parts linearly sliding in a housing, each suction-type gripper pair, disposed in a row of suction-type grippers symmetrically with respect to the central plane of the sheet-transfer drum, is associated with precisely one closing part, with the air-inlet openings and air-outlet openings, provided in the housing, for suction-type gripper pairs equidistant from the central plane being simultaneously closable.

This makes it possible, with just one multi-way slide-type shutoff valve, to interrupt the suction-air supply from a suction-air source to suction-type gripper pairs, equidistant from the central plane, in two or more rows of suction-type grippers. The setting of the suction air to a new sheet size can be controlled in simple manner through a bearing journal of the sheet-transfer drum. Because the suction-type gripper pairs for all rows of suction-type grippers are operated simultaneously, there is no possibility of errors in adjustment. In a simple variation, the closing parts in the housing may be rigidly interconnected and rigidly connected to an operating rod.

The operating device may be operated manually or may be connected to a driving device, the driving device being controlled by a central printing-press control.

Other features which are considered as characteristic for the invention are set forth in the appended claims.

Although the invention is illustrated and described herein as embodied in a multi-way slide-type shutoff valve for suction air of suction-type grippers on a sheet-transfer drum, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
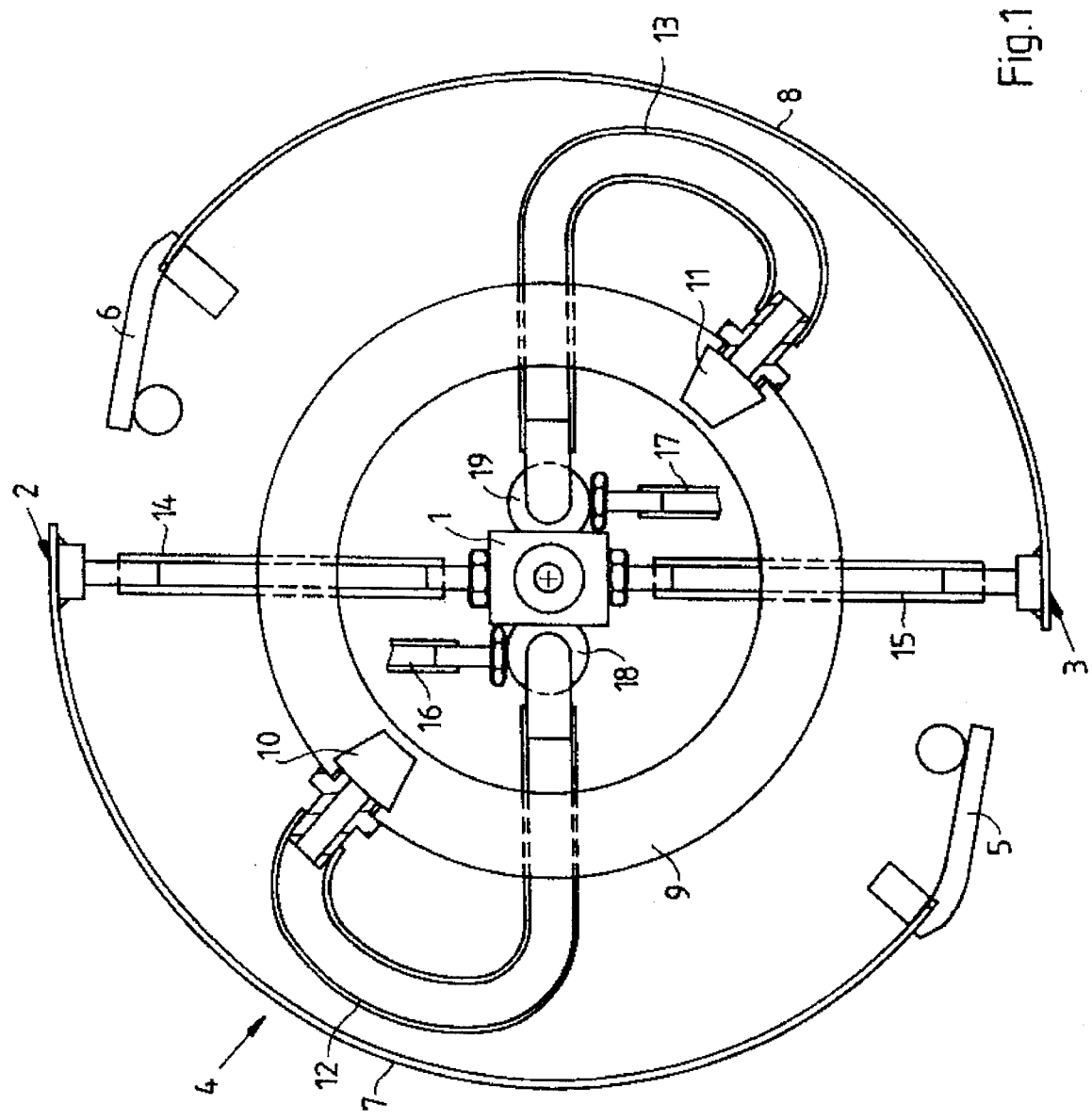
FIG. 1 is a diagrammatic cross-sectional view of a sheet-transfer drum incorporating the device according to the invention.

Referring now to the drawing and, first, particularly, to FIG. 1 thereof, there is shown therein, a multi-way slide-type shutoff valve 1 which is used to shut off the suction air for two rows of suction-type grippers 2, 3, which are disposed on a sheet-transfer drum 4. The sheet-transfer drum 4 is capable of holding two sheets 7, 8 by means of the rows of suction-type grippers 2, 3 and by means of mechanical grippers 5, 6. The supply of suction air to the multi-way slide-type shutoff valve 1 is through a rotary valve 9, with one rotary-valve connection 10, 11 being provided for each row of suction-type grippers 2, 3. Tubes 12, 13 lead from the rotary-valve connections 10, 11 to the multi-way slide-type shutoff valve 1. In addition, the rows of suction-type grippers 2, 3 are connected to the multi-way slide-type shutoff valve 1 by means of tubes 14, 15, 16, 17.

The tubes 16 and 17 lead directly from a connecting element 18, 19 to suction-type grippers 20, 21, 22, 23 (FIG. 2), which are situated closest to the central plane 24 of the sheet-transfer drum 4. The suction-type grippers 20, 21, 22, 23 lie under the smallest possible sheet size and need not, therefore, be shut off.

Figure 2:
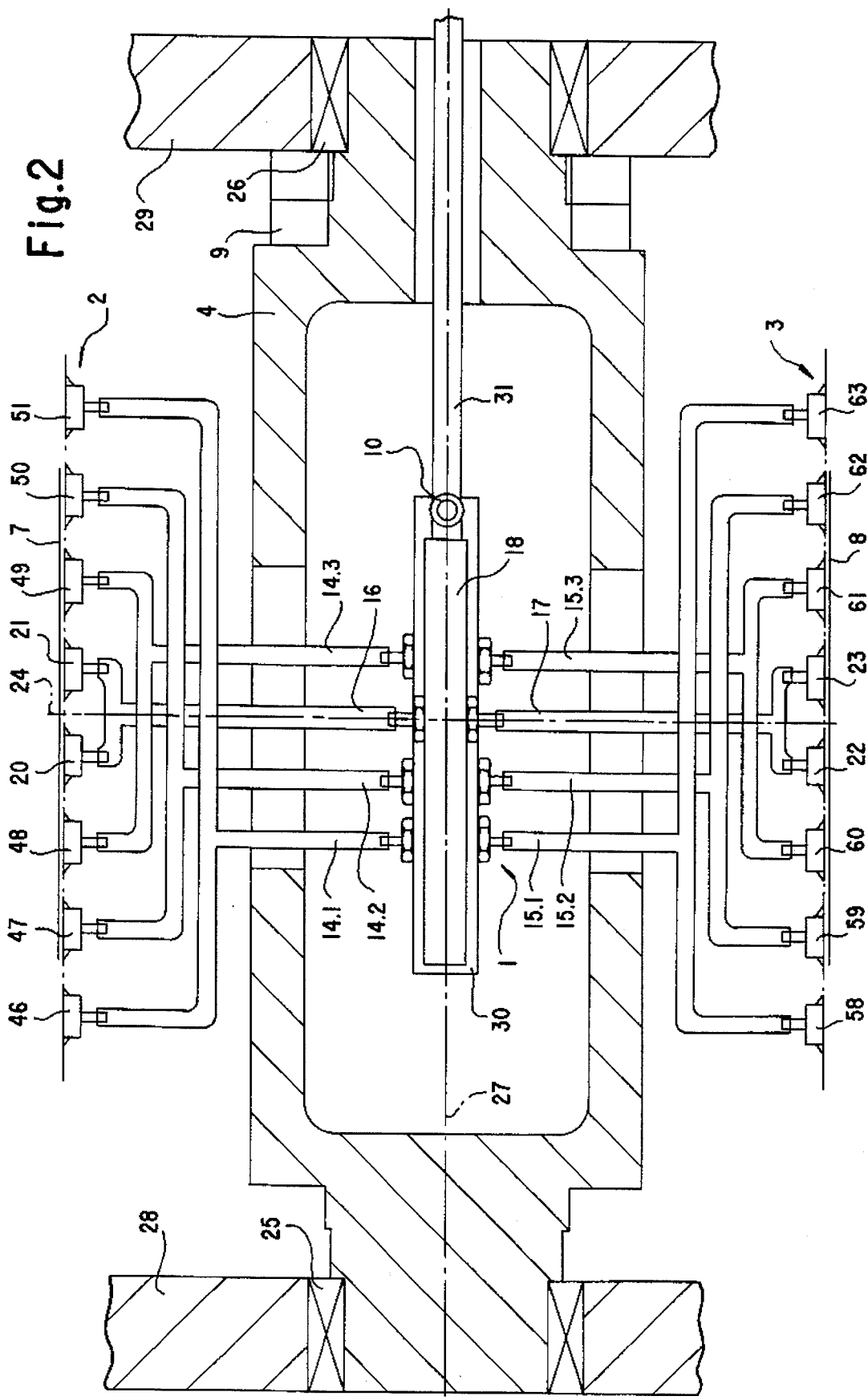
FIG. 2 is a diagrammatic longitudinal sectional view of the sheet-transfer drum including the device according to the invention.

The longitudinal sectional view of the sheet-transfer drum 4 in FIG. 2 shows the arrangement of the multi-way slide-type shutoff valve 1 inside the sheet-transfer drum 4.

The sheet-transfer drum 4 is supported so as to be rotatable about an axis 27 by means of bearings 25, 26, in side walls 28, 29 of the printing press. The housing 30 of the multi-way slide-type shutoff valve 1 is, just like an operating rod 31, disposed coaxially with the axis 27.

Figure 5:
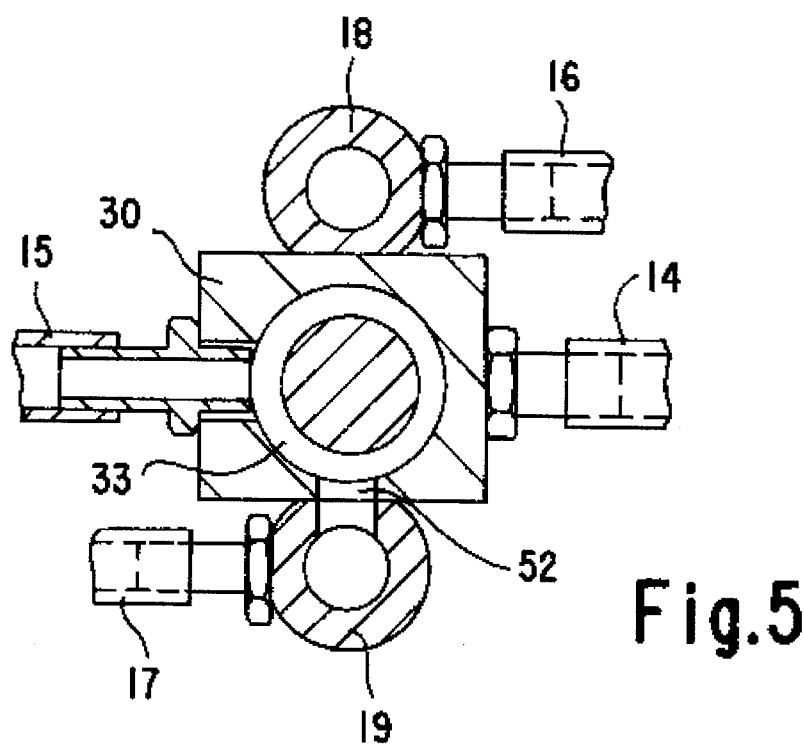
Figure 6:
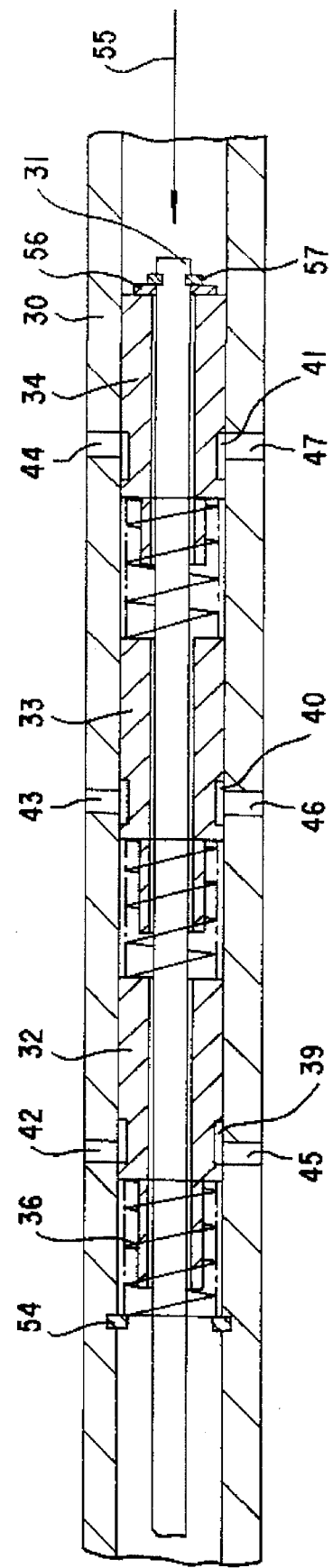
FIG. 6 is a diagrammatic longitudinal sectional view of another embodiment of a multi-way slide-type shutoff valve having springs with identical spring stiffness.

FIG. 6 shows the suction-air distribution by means of the multi-way slide-type shutoff valve 1 for one row of suction-type grippers 2. Situated inside the housing 30 are three closing parts 32, 33, 34. The base 35 of the housing 30 serves as a stop for the closing part 32. A spring 36 is provided between the base 35 and the closing part 32. Further springs 37, 38 are disposed between the closing parts 32, 33 and 33, 34. The closing parts 32, 33, 34 are of identical construction and have air passages 39, 40, 41, which, depending on the position thereof, are able to close air-inlet openings 42, 43, 44 and air-outlet openings 45, 46, 47 of the housing 30. The spring constants of the springs 36, 37, 38 have a ratio of 1:2:4 with respect to one another. The closing parts 32, 33, 34 are associated in pairs with suction-type grippers 48, 49; 50, 51 and 52, 53, the suction-type grippers 48, 49; 50, 51 and 52, 53 being situated symmetrically with respect to the central plane 24. The suction-type grippers 20, 21 are connected directly to the connecting element 18, so that the suction-type grippers 20, 21 cannot be turned off by the multi-way slide-type shutoff valve 1. For the pair-wise turning-off of the suction-type grippers 48, 49; 50, 51; 52, 53, the operating rod 31, which is connected to the closing part 34, is displaced a defined amount in the direction of the base 35. Due to the different spring stiffnesses of the springs 36, 37, 38, the closing elements 32, 33 are likewise displaced a defined amount. In the operating position shown in FIG. 4, the air-inlet openings 42 and the air-outlet openings 45 are closed by the closing part 32. That is, the suction-type grippers 48, 49 are turned off, because they are not required for holding a sheet 7 of a width as shown in FIG. 2 and because the vacuum in the remaining suction-type grippers 50, 51, 52, 53 must be maintained. The closing part 32 is in contact with the base 35. In the operating position shown in FIG. 5, the suction-type grippers 50, 51 are additionally turned off, due to which it is possible for a sheet 7, 8 of an even smaller width to be transported. In this position, the closing part 33 is in contact with the closing part 32. The displacement of the operating rod 31 may advantageously be accomplished by an electric motor or pneumatically by means of a 3-position cylinder.

In the modified embodiment of a multi-way slide-type shutoff valve 1 shown in FIG. 6, an operating rod 31 is provided, the operating rod 31 being guided by coaxial bores formed in the closing parts 32, 33, 34 for one row of suction-type grippers 2. The closing parts for a further row of suction-type grippers 3 may be provided in an extension of the operating rod 31. The spring 36 is braced against a ring 54 provided in the housing 30. In the displacement direction 55, a disc 56 is in contact with the closing part 34, while a disc 57, fixed in the operating rod 31, is in contact, in the displacement direction 55, with the disc 56.

It is possible to furnish the multi-way slide-type shutoff valves 1 with springs 36, 37, 38 of identical spring constant, with an accompanying increase in the travel of the closing parts 32, 33, 34 and in the width of the air passages 39, 40, 41 in the displacement direction 55.

Figure 7:
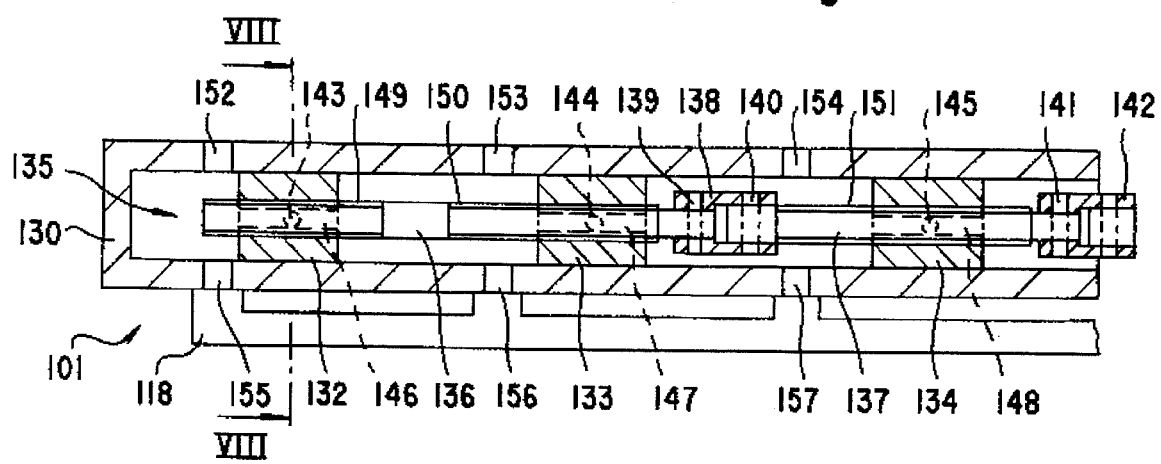
FIG. 7 shows a section through the multi-way slide-type shutoff valve.
Figure 8:
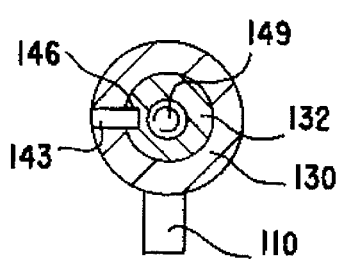
FIG. 8 shows a section through the multi-way slide-type shutoff valve along line IV—IV.

FIG. 7 shows the suction-air distribution by means of the multi-way slide-type shutoff valve 101 for one row of suction-type grippers 102. Situated inside the housing 130 are three closing parts 132, 133, 134. The closing parts 132, 133, 134 are seated with their female threads on the male thread of a two-part threaded spindle 135. The two coaxial parts 136, 137 of the threaded spindle 135 are interconnected by a sleeve 138 and by means of pins 139, 140. A connection piece 142 is seated, by means of a pin 141, on the end of the part 137 facing away from the sleeve 138, the connection piece 142 being adapted to be connected to the shaft of an electric motor (not shown). As can be seen in FIG. 8, the closing parts 132, 133, 134 are disposed in the housing 130 and are secured against rotation by means of pins 143, 144, 145 and longitudinal grooves 146, 147, 148. The threaded spindle 135 is provided with three threaded sections 149, 150, 151 of different pitches.

When the threaded spindle 135 is rotated by means of the aforementioned electric motor or, alternatively, by hand, the closing parts 132, 133, 134 cover different displacement distances in the housing 130, with the result that the air passages from the air-inlet openings 152, 153, 154 to the air-outlet openings 155, 156, 157 can be optionally closed one after the other. Consequently, the connection between the suction-type-gripper pairs 158, 159; 160, 161; 162, 163 and the suction-air source, connected through the intermediary of the rotary valve 109, is also interrupted. The electric motor may be connected to a control apparatus, with the result that the suction-type gripper pairs 158, 159; 160, 161; 162, 163 can be rendered inoperative by remote control.

The tubes 16' and 17' lead directly from a connecting element 18', 19' to suction-type grippers 20', 21', 22', 23' (FIG. 9), which are situated closest to the centre plane 24 of the sheet-transfer drum 4' and which lie under the smallest possible sheet size and need not, therefore, be shut off.

Figure 9:
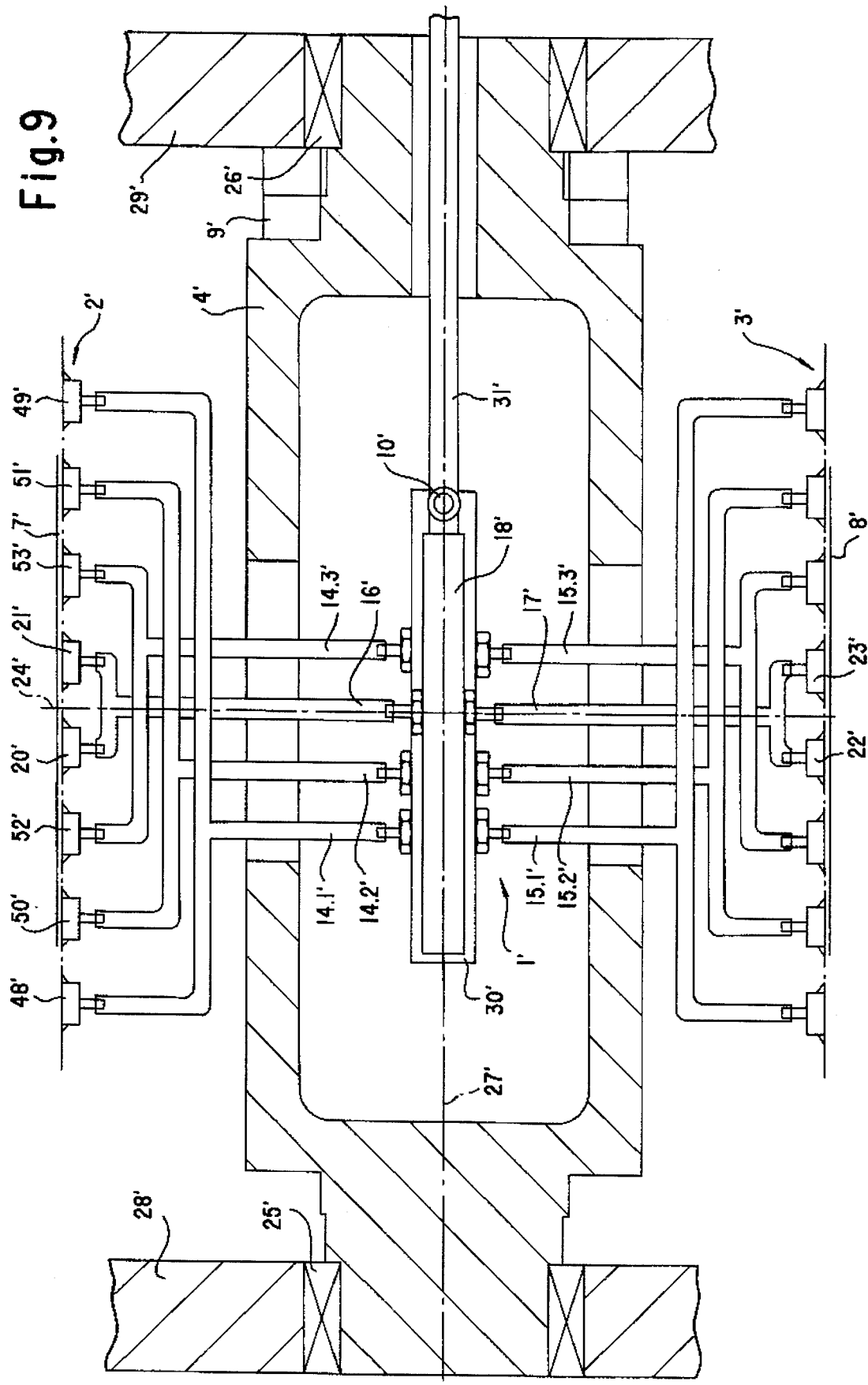
FIG. 9 shows a longitudinal section through a sheet-transfer drum.
Figure 10:
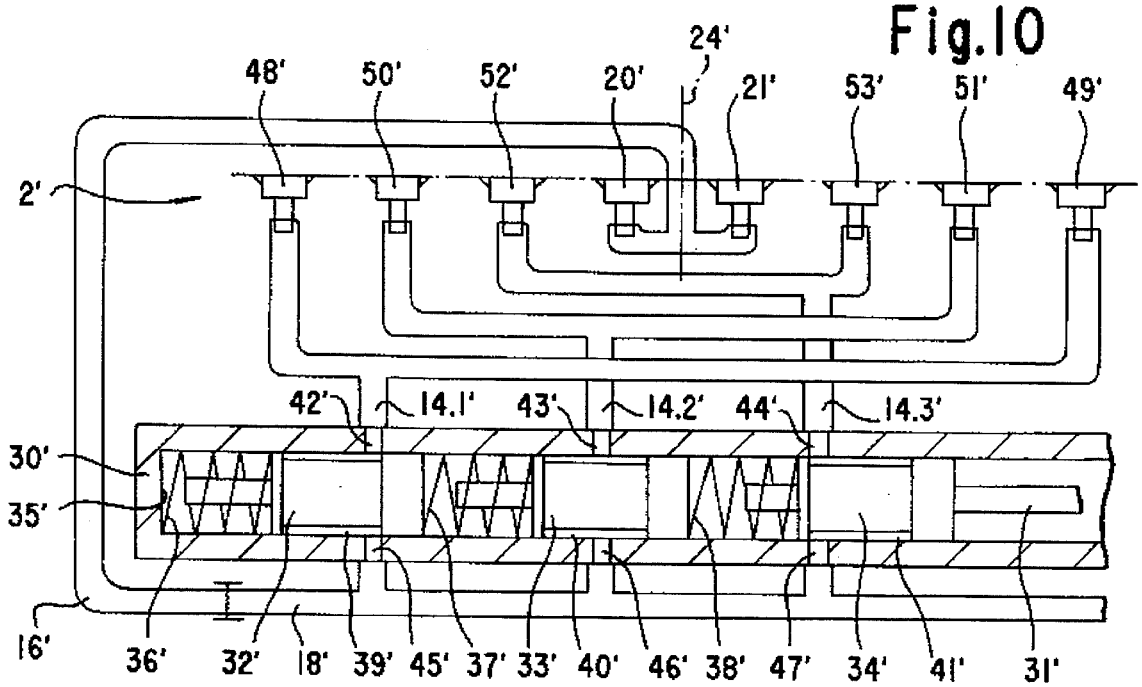
FIG. 10 shows a section through a multi-way slide-type shutoff valve.
Figure 11:
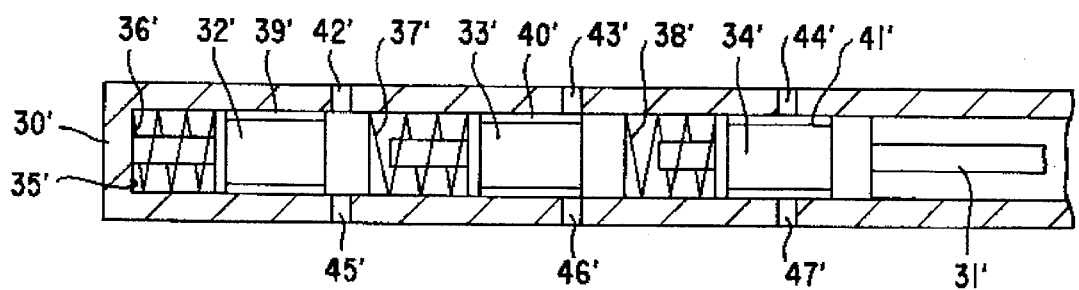
FIG. 11 shows a section through the multi-way slide-type shutoff valve according to FIG. 3 along line IV—IV.
Figure 12:
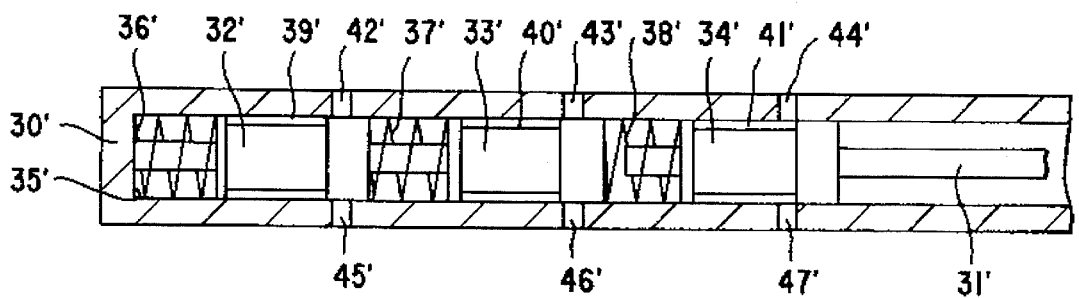
FIG. 12 shows a section through the multi-way slide-type shutoff valve according to FIG. 3 along line V—V.

The longitudinal section of the sheet-transfer drum 4' in FIG. 9 shows the arrangement of the multi-way slide-type shutoff valve 1' inside the sheet-transfer drum 4'.

The sheet-transfer drum 4' is held, rotatable about an axis 27' by means of bearings 25', 26', in side walls 28', 29' of the printing press. The housing 30' of the multiway slide-type shutoff valve 1' is, just like an operating rod 31', disposed coaxially with the axis 27'.

Figure 3:
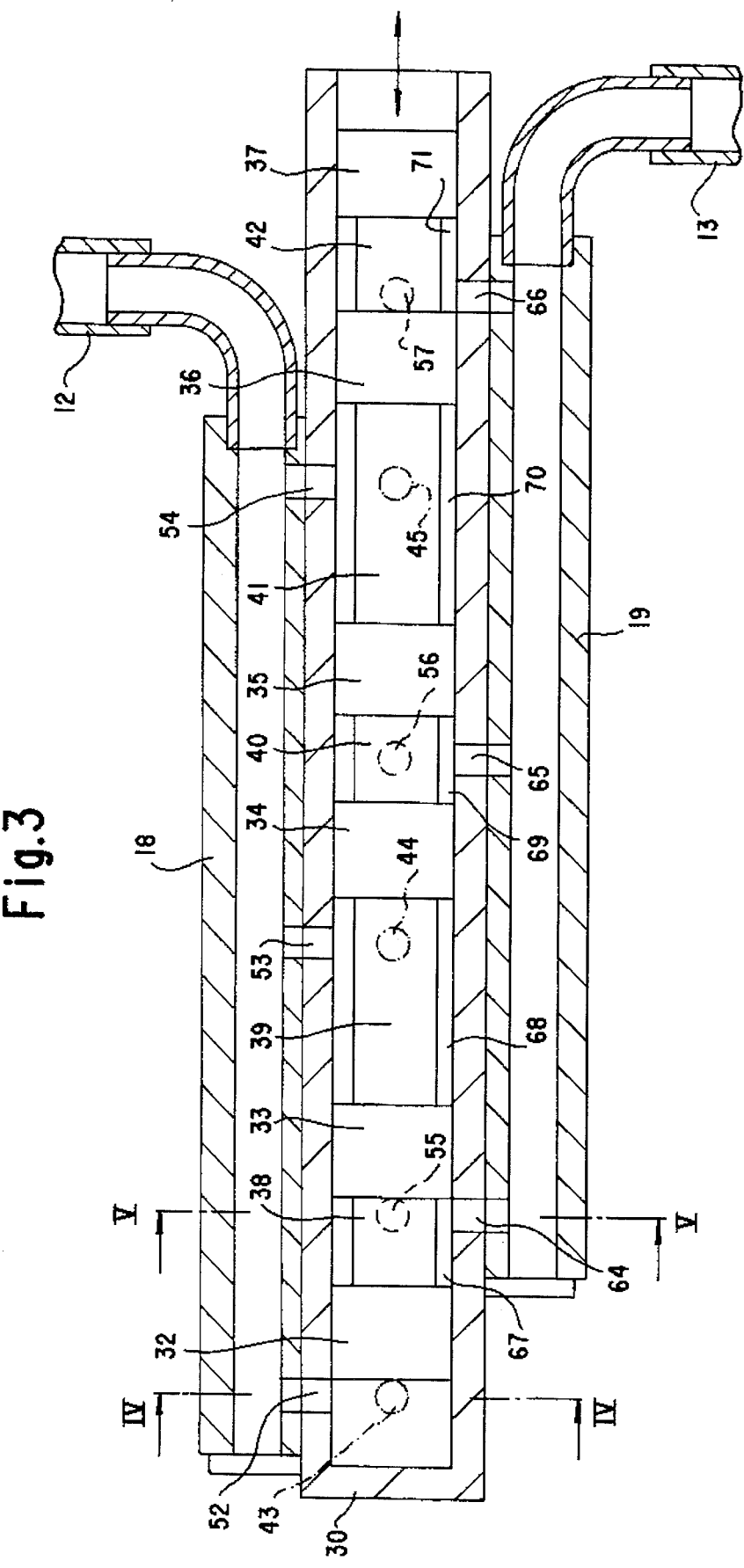
FIG. 3 is an enlarged longitudinal sectional view of a multi-way slide-type shutoff valve according to the invention.
Figure 4:
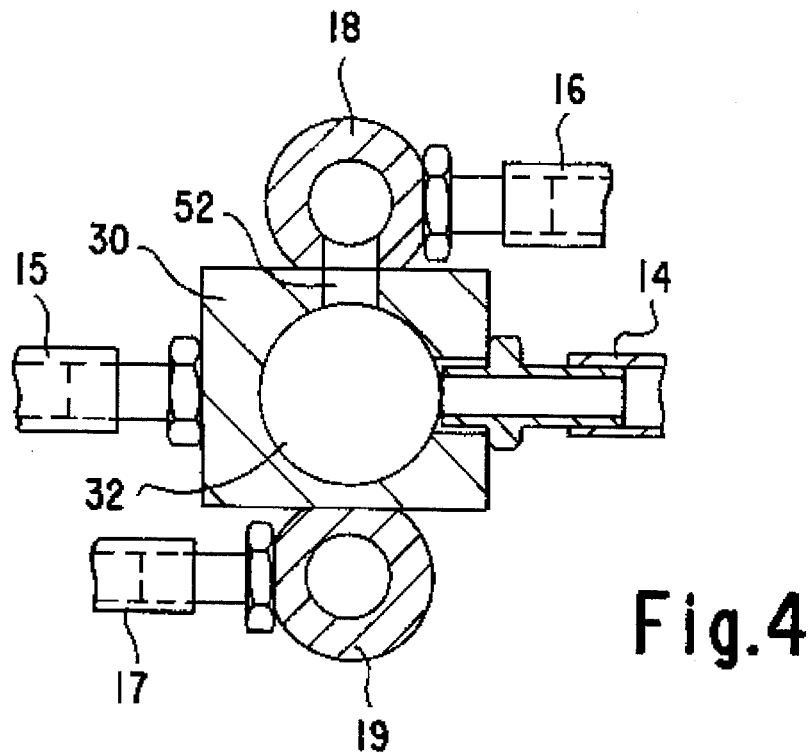
FIGS. 4 and 5 are cross-sectional views of a multi-way slide-type shutoff valve in further operating positions thereof.

FIGS. 3, 4 and 5 show the suction-air distribution by means of the multi-way slide-type shutoff valve 1 for two rows of suction-type grippers 2', 3'. Situated inside the housing 30 are six closing parts 32', 33', 34', 35', 36', 37', which are interconnected by means of connecting elements 38', 39', 40', 41', 42'. The last closing part 37' is connected to the operating rod 31. The closing parts 32', 34' and 36' are suitable for closing air-inlet openings 43', 44', 45', which are connected through the intermediary of tubes 14' to suction-type grippers 46', 47', 48', 49', 50', 51' of the row of suction-type grippers 2' (FIG. 2). At the same time, said closing parts 32', 34', 36' are able to close air-outlet openings 52', 53', 54', which are connected to a suction-air source through the intermediary of the connecting element 18', the tube 12' and the rotary-valve connection 10'. The second group of closing parts 33', 35', 37' is used to close air inlet openings 55', 56', 57', which are connected through the intermediary of tubes 15 to suction-type grippers 58', 59', 60', 61', 62', 63' of the row of suction-type grippers 3' (FIG. 2) and to close air-outlet openings 64', 65', 66', which are connected likewise to the aforementioned suction-air source through the intermediary of connecting element 19', the tube 13' and the rotary-valve connection 11. The connecting elements 38', 39', 40', 41', 42' allow air passages 67', 68', 69', 70', 71' between the air-inlet openings 44', 45', 55', 56', 57' and the associated air-outlet openings 53', 54', 64', 65', 66'.

With the closing parts 32', 33', 34', 35', 36', 37' in the position shown in FIG. 3, suction air is applied to all suction-type grippers 20', 21', 22', 23', 46', 47', 48', 49', 50', 51', 58', 59', 60', 61', 62', 63'. In order to change over to a smaller sheet size, closing parts 32', 33', 34', 35', 36', 37' are displaced by means of the operating rod 31', with the result that the outer suction-type-gripper pairs 46', 51' and 58', 63' and 47', 50' and 59', 62' and 48', 49' and 60', 61' of the rows of suction-type grippers 2' and 3' are successively rendered inoperative. In order to transport sheets 7', 8' of a width smaller than the maximum sheet width to be transported, the rows of suction-type grippers 46', 51' and 58', 63' are, as shown in FIG. 2, shut off into a first position through displacement of the operating rod 31'.

I claim:

1. Multi-way slide-type shutoff valve for suction air of suction-type grippers on a sheet-transfer drum, including a plurality of closing parts, linearly slidable in a housing for optionally closing air-inlet openings connected to intake ducts of the suction-type grippers, and for closing air-outlet openings connected to a suction-air source through the intermediary of a rotary valve, the closing parts having a cylindrical shape, at least some thereof being arranged adjacent one another and in coaxial alignment, and an operating device for displacing the closing parts, comprising springs having spring constants coordinated with one another and being disposed at least between the adjacent coaxial closing parts, at least an outer one of said closing parts being connected to the operating device.

2. Valve according to claim 1, having three of the closing parts with air passages, a spring disposed between one of the closing parts facing away from the operating device and a stop, the spring constants, acting in series, having a ratio of 1:2:4, the closing parts, when displaced in the direction of the stop, coming in contact engagement with one another.

3. Valve according to claim 1, wherein the closing parts, respectively, are each associated with the intake ducts of pairs of the suction-type grippers disposed symmetrically with respect to the central plane of the sheet-transfer drum.

4. Valve according to claim 1, wherein n closing parts are provided for shutting off every n suction-type grippers disposed in pairs with respect to the central plane of the sheet-transfer drum, further groups with n closing parts, respectively, being provided for every further row of suction-type grippers disposed on the sheet-transfer drum, the operating device including an operating rod having the housing thereon with all of the closing parts disposed therein.

5. Multi-way slide-type shutoff valve for suction air of suction-type grippers on a sheet-transfer drum, including a plurality of closing parts, linearly slidable in a housing for optionally closing air-inlet openings connected to intake ducts of the suction-type grippers, and for closing air-outlet openings connected to a suction-air source through the intermediary of a rotary valve, the closing parts having a cylindrical shape, and an operating device for displacing the closing parts, the operating device comprising a threaded spindle, the closing parts being disposed on said threaded spindle and being associated with at least two rows of the suction-type grippers, the closing parts being disposed in the housing in a manner so as to be secured against rotation, and said threaded spindle being connected to a rotational driving element.

6. Valve according to claim 5, wherein said threaded spindle is formed with sections of varying thread pitch, each of said sections being associated with a respective closing part.

7. Multi-way slide-type shutoff valve for suction air of suction-type grippers on a sheet-transfer drum, including a plurality of closing parts, linearly slidable in a housing for optionally closing air-inlet openings connected to intake ducts of the suction-type grippers, and for closing air-outlet openings connected to a suction-air source through the intermediary of a rotary valve, and an operating device for displacing the closing parts, the sheet-transfer drum having at least two rows of the suction-type grippers, the suction-type grippers being disposed in pairs symmetrically with respect to a central plane, comprising tube means for interconnecting the suction-type grippers in pairs, each of the suction-type gripper pairs in a respective row of the suction-type grippers being associated with a respective closing part, respective air-inlet openings and air-outlet openings for suction-type gripper pairs situated equidistantly from the central plane being respectively simultaneously closable.

8. Multi-way slide-type shutoff valve according to claim 7, wherein the closing parts are rigidly interconnected and rigidly connected to the operating device.

* * * * *